J. H. BROWN.
PNEUMATIC TIRE.
APPLICATION FILED JUNE 19, 1912.
1,238,099.
Patented Aug. 28, 1917.
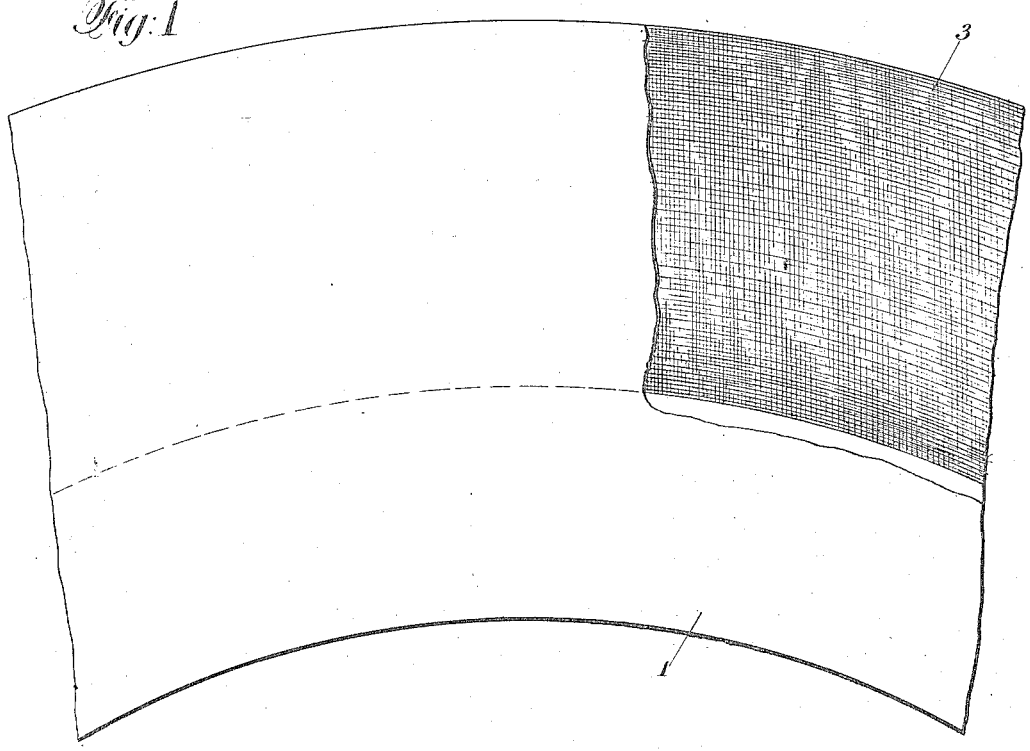
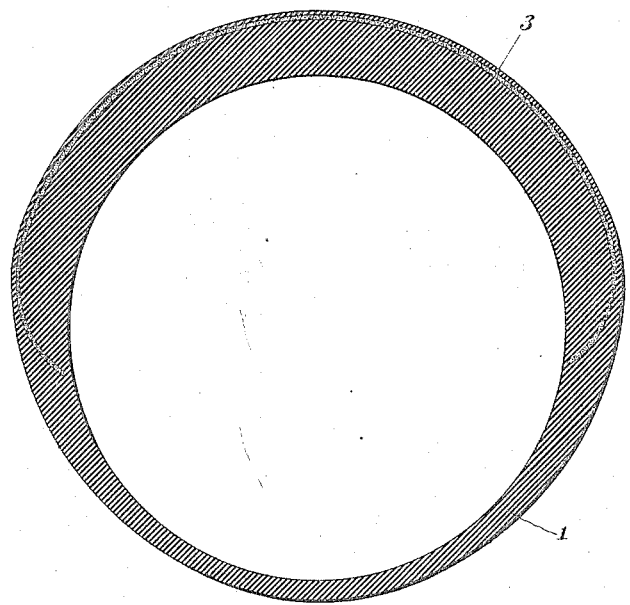

UNITED STATES PATENT OFFICE.

JOHN H. BROWN, OF NEW YORK, N. Y., ASSIGNOR TO BROWN PERFECTION TUBE COMPANY, OF NEW YORK, N. Y., A CORPORATION OF NEW YORK.

PNEUMATIC TIRE.

1,238,099.      Specification of Letters Patent.      Patented Aug. 28, 1917.

Application filed June 19, 1912. Serial No. 704,637.

*To all whom it may concern:*

Be it known that I, JOHN H. BROWN, of New York city, in the county of New York, and in the State of New York, have invented a certain new and useful Improvement in Pneumatic Tires, and do hereby declare that the following is a full, clear, and exact description thereof.

The object of my invention has been to provide a pneumatic tire having a tread of compressed rubber so that when a puncture occurs in the tread the rubber shall expand and fill the puncture and prevent the escape of air, and to such ends my invention consists in the pneumatic tire hereinafter specified.

In the accompanying drawings:

Figure 1 is a side elevation of a portion of a pneumatic tire embodying my invention; and Fig. 2 is a transverse sectional view of Fig. 1.

In illustrating my invention I have chosen the best embodiment known to me, but such embodiment is to be regarded as typical only of many possible embodiments, and my invention is not to be restricted to the particular embodiment shown.

My tire is specially intended for use as the inner tube of a double-tubed tire, but it is capable of use as a single-tube tire.

My tire consists of a rubber tube 1, having a thickened tread 2, which is held in compression by a compression band 3. The said band extends across the tread of the tire, preferably a little below the rubber surface thereof, and extends down the sides of the tube, and thence diagonally inward until its edges nearly, but not quite, reach the inner surface of the tube. The rubber beneath and inclosed by the compression band is placed under compression by making the tire wrong side out, according to the process, which is the subject of my companion application, executed June fifth, 1912, and then turning the said tire right side out. As the compression band cannot substantially expand, the rubber is compressed by this operation.

The rubber which I find most suitable from which to make my tire is good "live" rubber. I make the tread of sufficient thickness so that any lateral expansion of the compression band that may occur will not release the said compression sufficiently to cause it to fail to properly fill up a puncture, when one occurs.

The fabric which I use is one having sufficient elasticity so that, as the longitudinal periphery of the tread expands to fit the periphery of the tire shoe, the fabric will stretch and not break transversely. On the other hand, it is desirable to have as little elasticity to the said compression band transversely as may be. I find Sea Island canvas to be a fabric which complies with these conditions.

The rubber in the portion of the tire opposite the tread portion, being unrestrained by the compression band, may stretch, if necessary, so that the inner tube may completely fill the cross-section of the tire shoe.

The running of the edges of the compression band diagonally through the thickened rubber of the tread has a number of important advantages: I find, by experience, that tires of this type tend to crack along the edge of the compression band as the tire flattens under its load, and such crack will not only result in the breaking of the band away from the rubber, but in the cracking of the rubber through, so as to ruin the tire. By extending the edges of the compression band more than half way through the thickened tread, such edges pass from a zone of tension to a zone of compression, so to speak, where the rubber tends to hug the edge of the band and not to pull away from it. These zones of compression and tension are formed by the flattening of the tube by what might be termed a hinging action at the sides of the tire, due to the weight of the vehicle. The passing of the band diagonally through the thickened rubber of the tread makes a long diagonal joint between the rubber and the fabric on each side, which is one of great strength. If the fabric passed radially through the rubber, the surface adhesion between the fabric and rubber would be so slight that the two would be readily pulled apart. The diagonal joint, however, so greatly increases the adhesive surface that the joint is greatly strengthened and the surfaces lie at a more advantageous angle to resist the pull of separation.

The diagonal edges of the compression band form what might be termed a "compression dam", which tends to hold the rubber together under high compression, and to prevent a wave in the rubber readily traveling downward away from the tread.

As the compression band does not extend continuously from inside to outside of the rubber, the fibers of the fabric cannot form conduits, through which the air would otherwise escape.

When the outer surface of the compression band is covered with rubber, it is protected from wear against the interior of the shoe, as would otherwise be the case.

I preferably make the compression band narrow enough to allow an ample portion of the rubber tube to take care of any lateral expansion that may be required.

My tire has the inner periphery, which lies against the rim of the wheel, sufficiently shorter than the periphery of the tread of the tire so that no buckling of said first mentioned portion can occur, when the tire is placed on a wheel.

By the statement in the claims "the strains between the edges of said fabric and the rubber being transverse to the body of the fabric" is meant to express the avoidance of a straight-away pull between the edge of the fabric and rubber such as would occur if they met by a butt-to-butt joint at or near the outer surface of the tube.

By the term "integral" appearing in the claims, is meant not having a joint formed by cementing or hot vulcanizing flaps of the belly after the tread has been vulcanized.

I claim:

1. A tube for pneumatic tires, comprising a rubber tube having a thickened tread, fabric substantially covering the portion of said tread exposed to puncture and holding such portion in compression, said fabric throughout its surface being attached to said tread, said tube having an integral portion of unrestrained rubber between and integral with the edges of the tread to permit cross-sectional expansion of said tire.

2. A tube for pneumatic tires, comprising a rubber tube having a thickened tread, fabric substantially covering and holding such portion in compression, such fabric throughout its surface being attached to said tread, said tube having a portion of unrestrained rubber between and integral with the edges of the tread to permit cross-sectional expansion of said tube, said portion of unrestrained rubber being not substantially less than one-third the circumference of the tire.

3. A tube for pneumatic tires, comprising a rubber tube having a thickened tread, fabric substantially covering the portion of said tread exposed to puncture and holding such portion in compression, said fabric throughout its surface being attached to said tread and having its edges buried in said tread, said thickened portion of said tread extending beyond and inclosing said edges.

4. A pneumatic tire comprising a rubber tube having a thickened tread, a strip of fabric embedded in said tread, the body of said fabric lying near the outer periphery of said tread, and the edges of said fabric extending diagonally toward the inner periphery of said tread.

5. A pneumatic tire comprising a rubber tube having a thickened tread, a strip of fabric secured to the outer portion of said tread, and having its edges extended diagonally inward through the material of said tube, said tube having a portion between the edges of said fabric of unrestrained rubber to permit cross-sectional expansion of said tire.

6. In a pneumatic tire, the combination of a rubber tube having a thickened tread, a strip of fabric having its body secured to the outer portion of said tread to hold said tread in compression, the edges of said fabric pasing diagonally inward through said tread more than half its thickness and into rubber compressed by flattening of the tire.

7. A tube for pneumatic tires, comprising a rubber tube having a thickened tread, fabric substantially covering the portion of said tread exposed to puncture and holding such portion in compression, said fabric throughout its surface being attached to said tread, said tube having a portion of unrestrained rubber between the edges of the tread to permit cross-sectional expansion of said tube, the strains between the edges of said fabric and the rubber being transverse to the body of the fabric.

In testimony that I claim the foregoing I have hereunto set my hand.

JOHN H. BROWN.

Witnesses:
 EDWIN J. PRINDLE,
 SAMUEL SCHWARTZMAN.